United States Patent
Jheng et al.

(10) Patent No.: US 10,609,095 B2
(45) Date of Patent: *Mar. 31, 2020

(54) METHOD TO SUPPORT SERVICE CONTINUITY FOR MULTIPLE SESSIONS

(71) Applicant: MEDIATEK INC., Hsinchu (TW)

(72) Inventors: Yu-Syuan Jheng, Taipei (TW); Chien-Chun Huang-Fu, Hsinchu (TW); Nuan-Yu Yang, Taipei (TW)

(73) Assignee: HFI Innovation INC., Hsin-Chu (TW)

( * ) Notice: Subject to any disclaimer, the term of this patent is extended or adjusted under 35 U.S.C. 154(b) by 137 days.

This patent is subject to a terminal disclaimer.

(21) Appl. No.: 15/680,472

(22) Filed: Aug. 18, 2017

(65) Prior Publication Data
US 2017/0346860 A1 Nov. 30, 2017

Related U.S. Application Data

(63) Continuation of application No. 14/598,040, filed on Jan. 15, 2015, now Pat. No. 9,769,221.
(Continued)

(51) Int. Cl.
*H04L 29/06* (2006.01)
*H04W 36/00* (2009.01)
*H04W 4/16* (2009.01)

(52) U.S. Cl.
CPC ...... *H04L 65/1083* (2013.01); *H04L 65/1016* (2013.01); *H04L 65/1046* (2013.01);
(Continued)

(58) Field of Classification Search
None
See application file for complete search history.

(56) References Cited

U.S. PATENT DOCUMENTS

| 2007/0248079 A1 | 10/2007 | Jayaram et al. | 370/352 |
| 2010/0216500 A1 | 8/2010 | Shatsky | 455/518 |

(Continued)

FOREIGN PATENT DOCUMENTS

| CN | 102215466 A | 10/2011 |
| CN | 102448036 A | 5/2012 |

(Continued)

OTHER PUBLICATIONS

International Search Report and Written Opinion of International Search Authority for PCT/CN2015/070869 dated Apr. 27, 2015 (11 pages).
(Continued)

*Primary Examiner* — Yaotang Wang
(74) *Attorney, Agent, or Firm* — Imperium Patent Works; Zheng Jin

(57) ABSTRACT

A method to manage call continuity in a network environment including a circuit-switched network and an IP multimedia subsystem (IMS) network is provided. A UE monitors one or more ongoing sessions in an IMS network, and the ongoing sessions contain at least one conference call. The UE detects a network-switching event for the UE to switch from the IMS network to a circuit-switched CS network. The UE then determines the one or more ongoing sessions within the IMS network to be released or transferred to the CS network. Finally, the UE performs a session transfer procedure for transferring the determined sessions.

16 Claims, 4 Drawing Sheets

Related U.S. Application Data

(60) Provisional application No. 61/928,815, filed on Jan. 17, 2014.

(52) U.S. Cl.
CPC ........ H04L 65/403 (2013.01); H04L 65/4038 (2013.01); H04W 36/0011 (2013.01); H04W 36/0022 (2013.01); H04W 4/16 (2013.01)

(56) References Cited

U.S. PATENT DOCUMENTS

| | | | |
|---|---|---|---|
| 2011/0292841 A1* | 12/2011 | Sedlacek | H04W 36/0005 370/260 |
| 2012/0087339 A1* | 4/2012 | Wu | H04W 36/0022 370/331 |
| 2012/0213197 A1 | 8/2012 | Niemi et al. | 370/331 |
| 2015/0071247 A1* | 3/2015 | May-Weymann | H04W 36/0022 370/331 |

FOREIGN PATENT DOCUMENTS

| | | |
|---|---|---|
| EP | 2375812 A2 | 10/2011 |
| WO | WO2009130042 A2 | 10/2009 |
| WO | WO2013135316 A1 | 9/2013 |
| WO | WO2013156089 A1 | 10/2013 |

OTHER PUBLICATIONS

S2-131837 SA WG2 Meeting #S2-97; Ericsson et al.; SRVCC for Conference Call without I2; Busan, South Korea dated May 27-31, 2013 (2 pages).

3GPP IP Multimedia Subsystem (IMS) Service Continuity 3GPP TS 24.237 V 12.5.0, Clauses 6.2, 6.3.1, 6.3.2.1.

EPO, Search Report for the EP patent application 15737460.4 dated Aug. 10, 2016 (9 pages).

SIPO, search report for the CN application 201580002765.1 (no English translation is available) dated Sep. 29, 2018 (7 pages).

S2-131837 SA WG2 Meeting #S2-97, Ericsson et al., "SRVCC for conference call without I2", Busan, South Korea, May 27-31, 2013 (2 pages).

3GPP TS 23.237 V12.5.0 (Dec. 2013), 3rd Generation Partnership Project; Technical Specification Group Services and System Aspects; IP Multimedia Subsystem (MS) Service Continuity; Stage 2 (Release 12) *6.2, 6.3.1, 6.3.2.1*.

EPO, search report for the EP application 15737460.4 dated Mar. 4, 2019 (6 pages).

3GPP TSG-CT WG1 Meeting #86 C1-140198, Samsung, Setting the "MPTY auxiliary state" after access transfer of a conference call, Guangzhou, P.R. of China, Jan. 20-24, 2014 (9 pages).

* cited by examiner

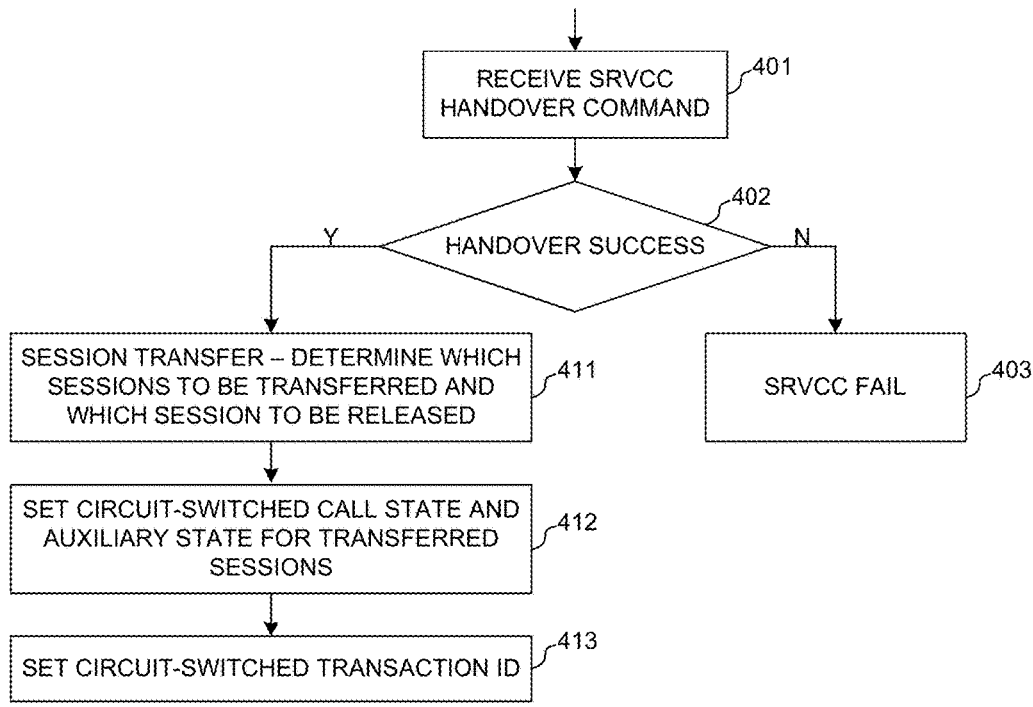

FIG. 4

| CONDITION | MOST RECENT ACTIVE | SECOND MOST RECENT ACTIVE | MOST RECENT INACTIVE | SECOND MOST RECENT INACTIVE | AFTER TRANSFER TO CS |
|---|---|---|---|---|---|
| 1 | CONFERENCE SESSION | NON-CONFERENCE SESSION | X | X | 1A MPTY + 1 HELD |
| 2 | NON-CONFERENCE SESSION | CONFERENCE SESSION | X | X | 1A + 1 HELD MPTY |
| 3 | CONFERENCE SESSION | 0 | NON-CONFERENCE SESSION | X | 1A MPTY + 1 HELD |
| 4 | NON-CONFERENCE SESSION | 0 | CONFERENCE SESSION | X | 1A + 1 HELD MPTY |
| 5 | 0 | 0 | CONFERENCE SESSION | X | 1 HELD MPTY |

METHOD TO SUPPORT SERVICE CONTINUITY FOR MULTIPLE SESSIONS

CROSS REFERENCE TO RELATED APPLICATIONS

This application is a continuation, and claims priority under 35 U.S.C. § 120 from nonprovisional U.S. patent application Ser. No. 14/598,040, entitled "Method to Support Service Continuity for Multiple Sessions," filed on Jan. 15, 2015, the subject matter of which is incorporated herein by reference. Application Ser. No. 14/598,040, in turn, claims priority under 35 U.S.C. § 119 from U.S. Provisional Application No. 61/928,815 entitled "Method to Support service continuity for multiple sessions," filed on Jan. 17, 2014, the subject matter of which is incorporated herein by reference.

TECHNICAL FIELD

The disclosed embodiments relate generally to mobile communication networks, and, more particularly, to support single radio voice call continuity when a user equipment (UE) handovers from LTE coverage (E-UTRAN) to UMTS/GSM coverage (UTRAN/GERAN).

BACKGROUND

Long Term Evolution (LTE), commonly marketed as 4G LTE, is a standard for wireless communication of high-speed data for mobile phones and data terminals. LTE is based on Global System for Mobile Communications (GSM) and Universal Mobile Telecommunication System (UMTS) technologies that provides higher data rate, lower latency and improved system capacity. In LTE systems, an evolved universal terrestrial radio access network (E-UTRAN) includes a plurality of base stations, referred as evolved Node-Bs (eNBs), communicating with a plurality of mobile stations, referred as user equipments (UEs).

The LTE standard is developed by 3GPP ($3^{rd}$ Generation Partnership Project) and is specified in its Release 8 document series, with enhancement described in later releases. LTE is the natural upgrade path for carriers with both GSM/UMTS networks and CDMA2000 networks. Along with LTE introduction, 3GPP also standardized Single Radio Voice Call Continuity (SRVCC) from Release 9 specifications to provide seamless continuity when a UE handovers from LTE coverage (E-UTRAN) to UMTS/GSM coverage (UTRAN/GERAN). With SRVCC, a call anchored in IP multimedia subsystem (IMS) core can continue to be served by UMTS and GSM networks outside of LTE coverage area.

3GPP Release 9 introduced the basic SRVCC scenario, which is to transfer a single call from IMS domain to circuit-switch (CS) domain. Further in later releases, emergency call, call in different states (e.g., hold, conference), alerting call, and video call are also supported to be transferred from IMS to CS. However, there are still some scenarios that are not defined clearly when multiple IMS ongoing sessions are established. Due to the lack of consistent agreement in 3GPP specification, the misbehaving UE implementation will result in unexpected call drop and/or un-synchronous call state after the UE camps to a new radio access network or new radio access technology.

To solve the problem, a scheme is disclosed in the present invention to manage call continuity in a network environment including a circuit-switched network and an IP multimedia subsystem (IMS) network during different circumstances.

SUMMARY

A method to manage call continuity in a network environment including a circuit-switched network and an IP multimedia subsystem (IMS) network is provided. A UE monitors one or more ongoing sessions in an IMS network, and the ongoing sessions contain at least one conference call. The UE detects a network-switching event for the UE to switch from the IMS network to a circuit-switched CS network. The UE then determines the one or more ongoing sessions within the IMS network to be released or transferred to the CS network. Finally, the UE performs a session transfer procedure for transferring the determined sessions.

In one embodiment, the network-switching event includes the UE receives a Single Radio Voice Call Continuity (SRVCC) Handover command. An ongoing conference call is transferred as an active or held CS multiparty voice call. If one conference call is transferred, then other conference calls are released. Each transferred session is mapped to a corresponding CS call control state, auxiliary state, and assigned with corresponding CS transaction identifiers.

Other embodiments and advantages are described in the detailed description below. This summary does not purport to define the invention. The invention is defined by the claims.

BRIEF DESCRIPTION OF THE DRAWINGS

FIG. 4 illustrates a flow chart of supporting service continuity for multiple sessions in accordance with one novel aspect.

FIG. 5 illustrates one embodiment of session transfer from IMS domain to CS domain.

DETAILED DESCRIPTION

Reference will now be made in detail to some embodiments of the invention, examples of which are illustrated in the accompanying drawings.

Figure 1:
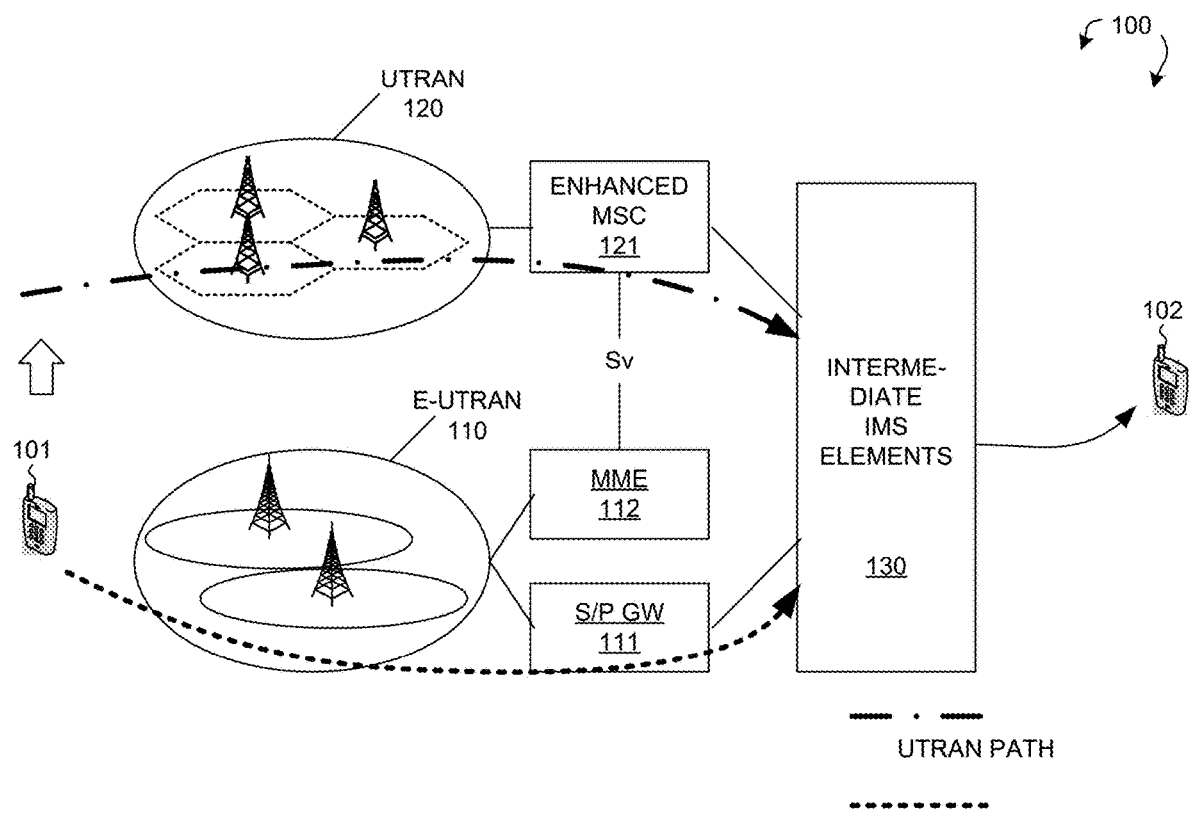
FIG. 1 schematically shows a mobile communication network having multiple radio access networks (RAN) in accordance with one novel aspect.

FIG. 1 schematically shows a mobile communication network 100 having multiple radio access networks (RAN) in accordance with one novel aspect. Mobile communication network 100 comprises a first user equipment UE 101 and a second UE 102, an evolved universal terrestrial radio access network (E-UTRAN) 110, a universal terrestrial radio access network (UTRAN) 120, a serving/packet gateway (S/P GW) 111, a mobility management entity (MME) 112, an enhanced mobile switching Centre (MSC) 121, and an intermediate IP multimedia subsystem (IMS) elements 130. In the example of FIG. 1, UE 101 establishes a call with UE 102 via E-UTRAN 110 in LTE (EPS/IMS) domain. Later on, when UE 101 moves to another location, the LTE coverage is no longer available. Instead, only UMTS/GSM coverage becomes available. In order to support service continuity, the network will handover UE 101 from E-UTRAN 110 to UTRAN 120 where only circuit switch based service is available for voice/video calls.

For IMS domain calls, there is no restriction in principle. The packet-switch based service can support up to M voice calls and N video calls, where M and N can be any number depending on UE design. In addition, the maximum number of a conference call is unlimited. On the other hand, for circuit-switch based service, there are certain restrictions for calls. For voice calls, CS domain only allows at most 1 voice active call+1 voice held call+1 alerting call in parallel. While a voice call can be a single call or a conference call, only one conference all can be supported, either active or held. The maximum party number of conference call is 5. For video calls, CS domain video call cannot be held, and CS domain video call cannot be conference call.

3GPP standardized Single Radio Voice Call Continuity (SRVCC) to provide seamless continuity when a UE handovers from LTE coverage (E-UTRAN) to UMTS/GSM coverage (UTRAN/GERAN). With SRVCC, a call anchored in IMS core can continue to be served by UMTS and GSM networks outside of LTE coverage area. 3GPP Release 9 introduced the basic SRVCC scenario, which is to transfer a single call from IMS domain to circuit-switch (CS) domain. Further in later releases, emergency call, call in different states (e.g., hold, conference), alerting call, and video call are also supported to be transferred from IMS to CS. For example, the specification has defined how to handle call transfer with supplementary for following cases: 1) keep the call state the same as the original domain; 2) if multiple sessions, then the most recent session is transferred as active state, and the second most recent session is transferred as held state.

However, there are still some scenarios that are not defined clearly when multiple IMS ongoing sessions are established. Due to the lack of consistent agreement in 3GPP specification, the misbehaving UE implementation will result in unexpected call drop after the UE camps to a new radio access network or new radio access technology. In addition, different understanding of transferred session may result in serious user experience. In accordance with one novel aspect, call handling is defined during call transfer for the purpose of synchronization between UE and different network entities, and for purpose of smooth user experience during call transfer. More specifically, the transfer of conference call and state mapping, and CS auxiliary state and TI assignment are defined when UE handovers from LTE coverage to UMTS/GSM coverage with service continuity.

Figure 2:
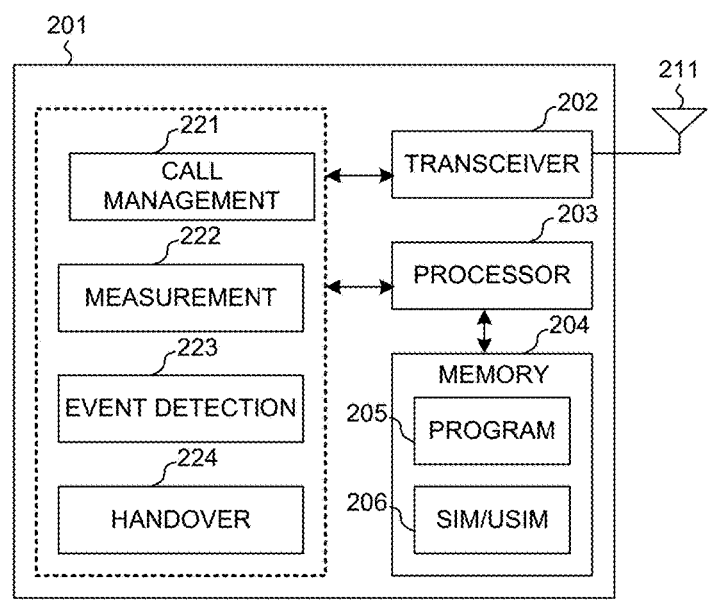
FIG. 2 is a simplified block diagram of a user equipment (UE) that supports embodiments of the present invention.

FIG. 2 is a simplified block diagram of a user equipment (UE) 201 that supports embodiments of the present invention. UE 201 has RF transceiver module 202, coupled with antenna 211, receives RF signals from antenna 211, converts them to baseband signals and sends them to processor 203. RF transceiver 202 also converts received baseband signals from the processor 203, converts them to RF signals, and sends out to antenna 211. Processor 203 processes the received baseband signals and invokes different functional modules to perform features in the UE. Memory 204 stores program instructions and data to control the operations of the UE.

FIG. 2 further illustrates four functional modules and circuits 221 to 224 in UE 201 that carry out embodiments of the current invention. The functional modules and circuits may be implemented by hardware, firmware, software, or any combination thereof. For example, each circuit or module may comprise the processor 203 plus corresponding software codes. The function modules and circuits, when executed by processors 203 (e.g., via executing program codes 205), for example, allow UE 201 to properly detect handover event and perform handover from IMS domain to CS domain. In one example, a call management circuit 221 that manages various configuration related to an established radio connection and ongoing sessions, a measurement circuit 222 performs radio signal measurement and thereby monitoring the radio connection, an event-detection circuit 223 detects various event such as receiving a handover command, and a handover circuit 224 that implements various features of handover and call transfer supporting voice call service continuity for multiple sessions.

Figure 3:
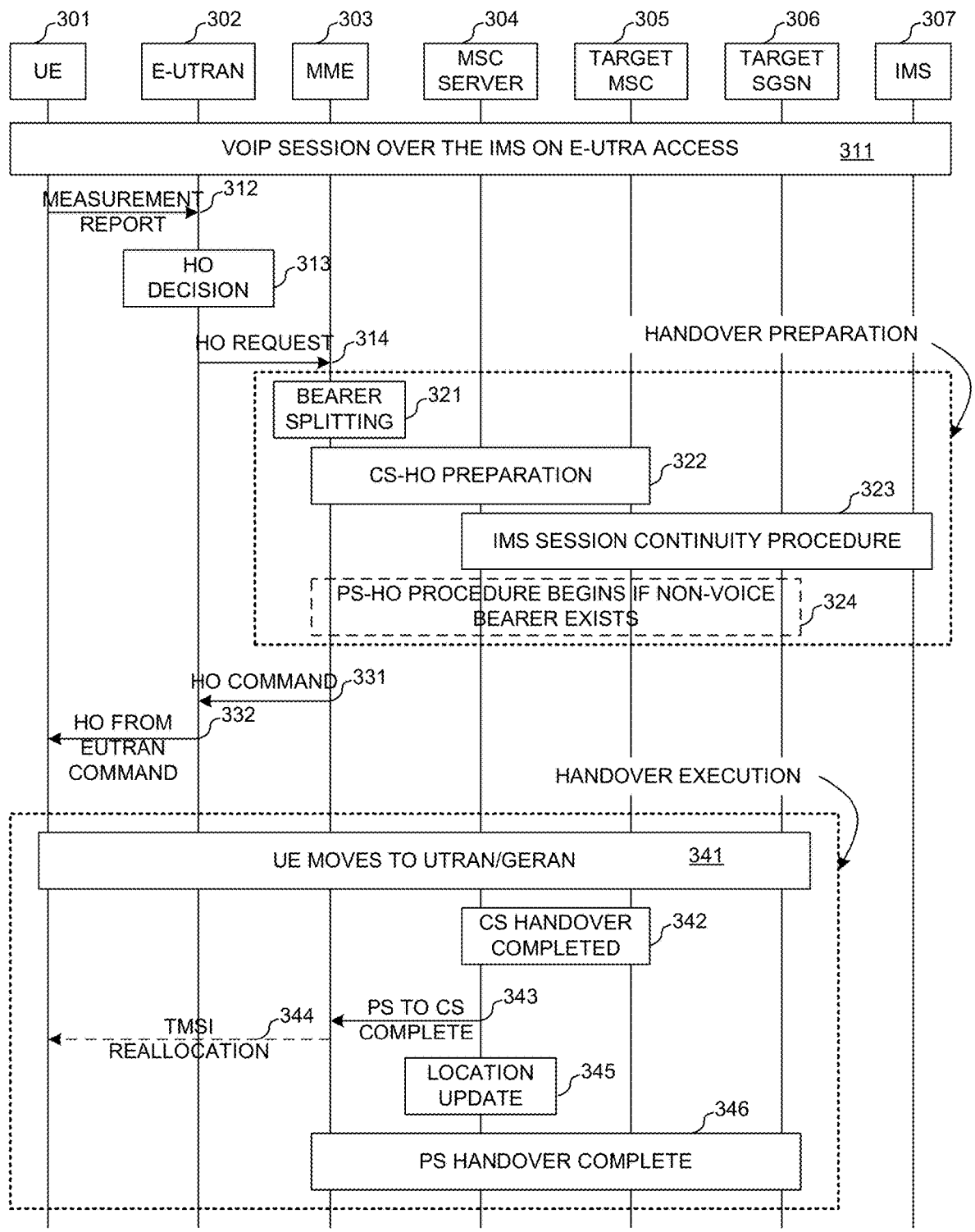
FIG. 3 illustrates a standardized Single Radio Voice Call Continuity (SRVCC) procedure with enhanced service continuity for multiple sessions.

FIG. 3 illustrates a standardized Single Radio Voice Call Continuity (SRVCC) procedure with enhanced service continuity for multiple sessions. Mobile communication network 300 comprises UE 301, E-UTRAN 302, MME 303, MSC server 304, target MSC 305, target SGSN 306, and IMS 307. In step 311, a UE 301 establishes a voice over IP (VOIP) session over the IMS core on E-UTRAN radio access in an LTE cell. In step 312, UE 301 performs radio signal measurements and sends a measurement report to E-UTRAN 302. For example, the measurement report indicates that the radio signal strength or quality of the LTE cell is below a predefined threshold. This could happen when UE 301 moves out of the LTE coverage area. Based on the measurement report, the network makes handover decision in step 313. For example, the network decides to handover UE 301 from E-UTRAN to UTRAN/GERAN, which supports CS-based call only. In step 314, E-UTRAN 302 sends out a handover request to mobility management entity MME 303, which starts handover preparation. In step 321, MME 303 performs bearer splitting. In step 322, CS-HO preparation is performed by MME 302, MSC server 304, and target MSC 305. In step 323, IMS session continuity procedure is performs by MSC server 304, target MSC 305, target SGSN 306, and IMS 307. If non-voice bearer exists, in step 324, PS-HO procedure begins among MME 303, MSC server 304, target MSC 305, and target SGSN 306. After handover preparation, MME 303 sends a HO command to E-UTRAN 302 in step 331. In step 332, E-UTRAN 302 forwards the HO command to UE 301. After receiving the HO command, handover execution is then started. In step 341, UE 101 moves to UTRAN/GERAN from E-UTRAN. In step 342, circuit-switched CS handover is completed. In step 343, MSC server 304 sends a PS to CS complete message to MME 303, which optionally sends a TMSI reallocation message to UE 301 in step 344. In step 345, MSC server 304 performs location update. Finally, in step 346, packet-switched PS handover is completed.

SRVCC is a level of functionality that is required within LTE systems to enable the packet domain calls on LTE to be handover to legacy circuit switched voice systems such as GSM, UMTS, and CDMA in a seamless manner. SRVCC is a scheme that enables inter radio access technology (inter-RAT) handover as well as handover from packet data to circuit switched data voice calls. By using SRVCC, operators are able to make the handovers while maintaining existing quality of service (QoS) and ensure that call continuity meets the critical requirements for emergency calls. The SRVCC implementation controls the transfer of calls in both directions. Handover from LTE to the legacy network is required when the user moves out of the LTE coverage area. Using SRVCC, the handover is undertaken in two stages. A first stage is the radio access technology (RAT) transfer. A second stage is session transfer. The session transfer is required to move the access control and voice media anchoring from the Evolved Packet Core (EPC) of the packet switched LTE network to the legacy circuit switched network.

The SRVCC handling is performed in step 341. The current SRVCC handling, however, has not defined call transfer involving multiple ongoing sessions and conference calls. If UE 301 has established multiple ongoing sessions in IMS domain, and if the multiple ongoing sessions include conference call(s), then the UE shall follow specific rules during the call transfer. The UE needs to determine 1) which session should be transferred or released, 2) how to map the CS call state and the auxiliary state for the transferred session; and 3) how to set the CS transaction identifier (TI) assignment.

FIG. 4 illustrates a flow chart of supporting service continuity for multiple sessions in accordance with one novel aspect. In step 401, a UE receives a SRVCC handover command from the network. The handover command is for the UE to handover from E-UTRAN to UTRAN/GERAN, e.g., when the UE moves out of the LTE coverage area. In step 402, the UE determines whether the SRVCC handover is successful. If not, then the UE fails to maintain the voice call continuity (step 403). If yes, then the UE continues to handle SRVCC. In step 411, the UE handles session transfer for its multiple ongoing sessions from PS domain to CS domain. The UE determines which session(s) to be transferred to CS domain and which session(s) to be released in CS domain. In step 412, the UE sets the circuit-switched call state and auxiliary state for the transferred session(s). In step 413, the UE sets the circuit-switched transaction ID.

FIG. 5 illustrates one embodiment of session transfer from IMS domain to CS domain. In IMS domain, a UE may have established multiple ongoing sessions, and each session having different call state. A call can be a single voice call, a conference call, or a video call. A call can be active, held, or alerting. In CS domain, a call state includes null, alerting, call delivered, call active (A), and an auxiliary state includes held and multiparty (MPTY). The general SRVCC principles remain the same: 1) keep the call state the same as the original domain; 2) if multiple sessions, then the most recent session is transferred as active state, and the second most recent session is transferred as held state. However, special scenarios occur when multiple ongoing sessions with conference call(s) are involved. In general, if only one ongoing session with active or inactive speech media component exists, and the ongoing session with active or inactive speech media component is a conference call, then the UE shall replace the speech media component of the ongoing session with the newly established active or held CS multiparty voice call. If more than one ongoing session with active or inactive speech media component exist, and at least one of the ongoing sessions with active or inactive speech media component is a conference call, then the UE shall select and replace the speech media component of one of the ongoing sessions with the newly established active or held CS multiparty voice call. The selection is determined based on when the active or inactive speech media component was made, e.g., mostly recently or second most recently. If one conference session is to be replaced and transferred to CS domain, then all other conference sessions shall be released.

Table 500 illustrates different scenarios for transfer of conference call(s) and state mapping. In a first scenario, the most recently active call is a conference call, and the second most recently active call is a non-conference call. When transferring to CS domain, the most recently active call is transferred to become an active multi-party (A MPTY) call, and the second most recently active call is transferred to become a held call. This is true regardless of any inactive calls. In a second scenario, the most recently active call is a non-conference call, and the second most recently active call is a conference call. When transferring to CS domain, the most recently active call is transferred to become an active (A) call, and the second most recently active call is transferred to become a held MPTY call. This is true regardless of any inactive calls. In a third scenario, the most recently active call is a conference call, there is no other active call, and the most recently inactive call is a non-conference call. When transferring to CS domain, the most recently active call is transferred to become an active multi-party (A MPTY) call, and the most recently inactive call is transferred to become a held call. This is true regardless of any other inactive calls. In a fourth scenario, the most recently active call is a non-conference call, there is no other active call, and the most recently inactive call is a conference call. When transferring to CS domain, the most recently active call is transferred to become an active (A) call, and the most recently inactive call is transferred to become a held MPTY call. This is true regardless of any other inactive calls. Finally, in a fifth scenario, there are no active calls. The most recently inactive call is a conference call, which is transferred to CS domain as a held MPTY call, regardless of any other inactive calls.

The 3GPP LTE specification also defines CS call control state mapping for SRVCC after handover to CS domain. When a session is transferred to a CS active call, the UE shall move to Call Active (U10) state defined in 3GPP TS24.008. When a session is transferred to a CS held call, the UE shall move to Call Active (U10) state defined in 3GPP TS24.008 and Call Held Auxiliary State defined in 3GPP TS24.083. When a session is transferred to a CS MPTY call, the UE shall move to Call Active (U10) state defined in 3GPP TS24.008 and Call in MPTY Auxiliary State defined in 3GPP TS24.084.

When session transfer is performed from IMS domain to CS domain, only at most two sessions will be transferred. The UE shall associate each transferred session with a transaction identifier (TI) as following: If the active IMS ongoing session is a conference call and has been transferred to CS active (A) call, the UE shall associate the participants in the conference session with CS call with transaction identifier 0, 2, 3, 4, 5. If two sessions are transferred, the first transferred session is a non-conference call and the second transferred session is a conference call, then the UE shall associate the first transferred session with CS call with transaction identifier 0, and associate the participants in the conference session with CS call with transaction identifier 1, 3, 4, 5, 6.

Figure 6:
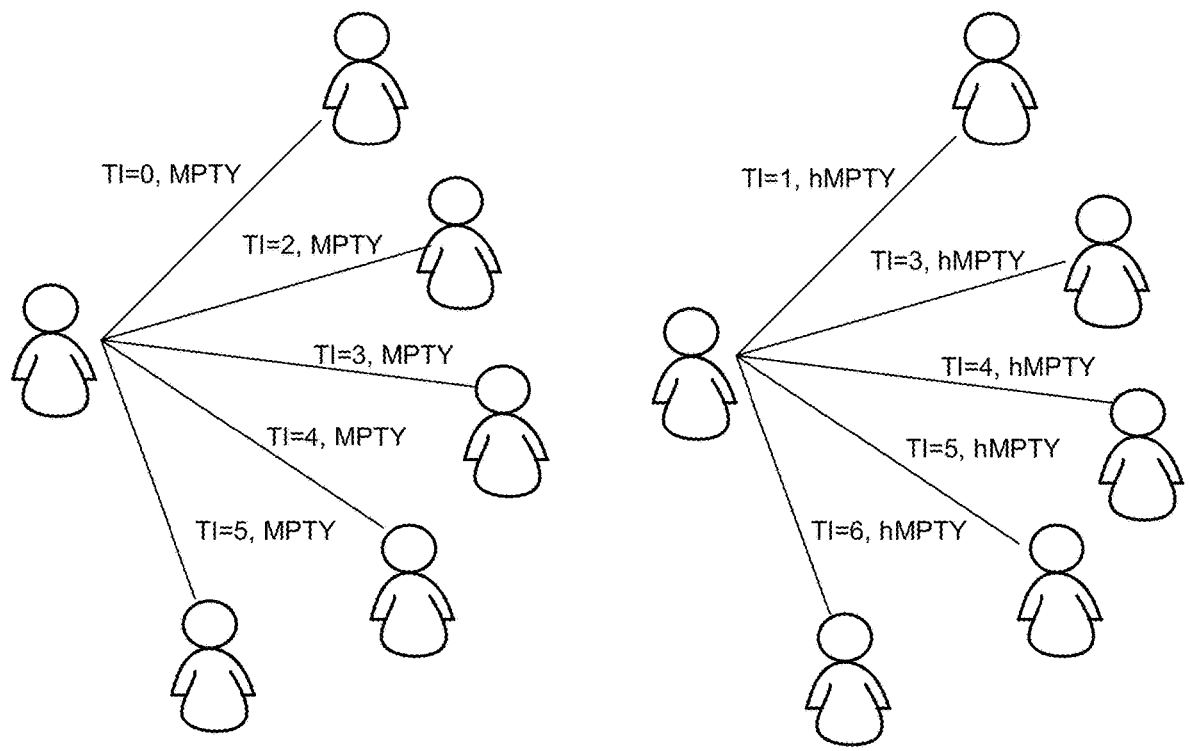
FIG. 6 illustrates one embodiment of transaction ID assignment from IMS domain to CS domain.

FIG. 6 illustrates one embodiment of transaction ID assignment from IMS domain to CS domain. In the left diagram of FIG. 6, a conference call in IMS domain is transferred to CS domain as a CS active multi-party call. In such a case, the UE shall associate the participants in the conference session (multi-party) with CS call with transaction identifiers 0, 2, 3, 4, 5. In the right diagram of FIG. 6, a single voice call is transferred to CS domain as an active call, and a conference call in IMS domain is transferred to CS domain as a CS held multi-party call. In such a case, the UE shall associated the single voice call with CS call with transaction identifier 0, and associate the participants in the conference session (multi-party) with CS call with transaction identifiers 1, 3, 4, 5, 6. This way, the TI assignment is consistent with legacy CS domain voice calls.

Alerting session is also supported by IMS domain and needs to be handled. The alerting session may be released or transferred to CS domain. When releasing the alerting session, UE may send a SIP 480 (Temporary Unavailable) response to reject the SIP INVITE request. In the current 3GPP restriction, when there is 1A+1Held+1alerting, the alerting session will be released. However, it is an available situation in CS domain, and the alerting session can be transferred to CS domain.

Figure 7:
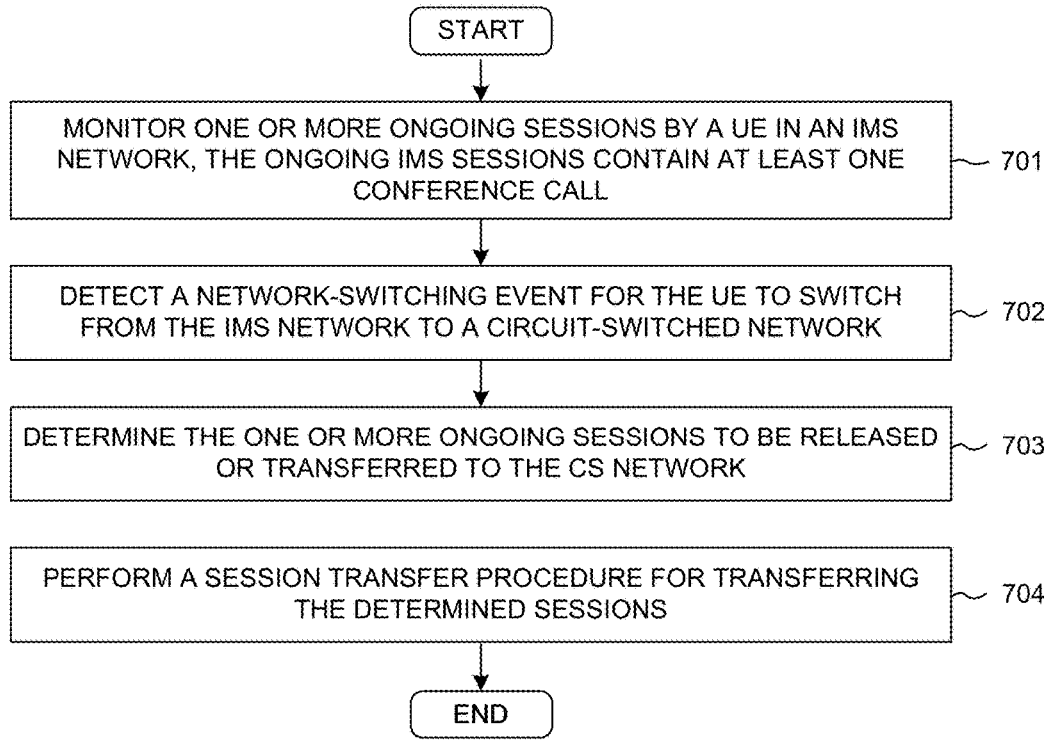
FIG. 7 is a flow chart of a method of supporting service continuity for multiple sessions in accordance with one novel aspect.

FIG. 7 is a flow chart of a method of supporting service continuity for multiple sessions in accordance with one novel aspect. In step 701, a UE monitors one or more ongoing sessions in an IMS network, and the ongoing sessions contain at least one conference call. In step 702, the UE detects a network-switching event for the UE to switch from the IMS network to a circuit-switched CS network. In step 703, the UE determines the one or more ongoing sessions within the IMS network to be released or transferred to the CS network. In step 704, the UE performs a session transfer procedure for transferring the determined sessions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
(a) monitoring one or more ongoing sessions in an IP multimedia subsystem (IMS) network by a user equipment (UE), wherein the ongoing IMS sessions contain at least one conference call;
(b) detecting a network-switching event for the UE to switch from the IMS network to another circuit-switched (CS) network;
(c) determining the one or more ongoing sessions within the IMS network to be released or transferred to the CS network; and
(d) performing a session transfer procedure for transferring the determined sessions, wherein no ongoing session with an active speech media exists, wherein one ongoing session with an inactive speech media component is a conference call, and wherein (c) involves: replacing the speech media component of the most recently inactive conference call with a newly established held CS multiparty voice call, wherein an active IMS ongoing session is a conference call and has been transferred as an active CS multiparty voice call, and wherein the UE associates participants in the conference call session with transaction identifiers 0, 2, 3, 4, and 5.

2. The method of claim 1, wherein the network-switching event includes the UE receives a Single Radio Voice Call Continuity (SRVCC) Handover command.

3. The method of claim 1, wherein the session transfer procedure (d) involves mapping each transferred session to a corresponding CS call control state, auxiliary state, and transaction identifier (TI) assignment.

4. The method of claim 1, wherein a first IMS session has been transferred as an active CS voice call, wherein a second IMS session has been transferred as a held CS multiparty voice call, wherein the UE associates the first IMS session with transaction identifier 0, and wherein the UE associates participants in the second IMS session with transaction identifiers 1, 3, 4, 5, and 6.

5. The method of claim 1, wherein the UE handles an alert session by releasing the alerting session or transferring the alerting session to CS domain.

6. A method, comprising:
(a) monitoring one or more ongoing sessions in an IP multimedia subsystem (IMS) network by a user equipment (UE), wherein the ongoing IMS sessions contain at least one conference call;
(b) detecting a network-switching event for the UE to switch from the IMS network to another circuit-switched (CS) network;
(c) determining the one or more ongoing sessions within the IMS network to be released or transferred to the CS network; and
(d) performing a session transfer procedure for transferring the determined sessions, wherein one ongoing session with an active speech media component exist and one ongoing session with an inactive speech media component is a conference call, and wherein (c) involves: replacing the speech media component of the most recently active session with a newly established active CS voice call; and replacing the speech media component of the most recently inactive conference call with a newly established held CS multiparty voice call, wherein an active IMS ongoing session is a conference call and has been transferred as an active CS multiparty voice call, and wherein the UE associates participants in the conference call session with transaction identifiers 0, 2, 3, 4, and 5.

7. The method of claim 6, wherein the network-switching event includes the UE receives a Single Radio Voice Call Continuity (SRVCC) Handover command.

8. The method of claim 6, wherein the session transfer procedure (d) involves mapping each transferred session to a corresponding CS call control state, auxiliary state, and transaction identifier (TI) assignment.

9. The method of claim 6, wherein a first IMS session has been transferred as an active CS voice call, wherein a second IMS session has been transferred as a held CS multiparty voice call, wherein the UE associates the first IMS session with transaction identifier 0, and wherein the UE associates participants in the second IMS session with transaction identifiers 1, 3, 4, 5, and 6.

10. The method of claim 6, wherein the UE handles an alert session by releasing the alerting session or transferring the alerting session to CS domain.

11. A user equipment (UE), comprising:
a measurement circuit that monitors one or more ongoing sessions in an IP multimedia subsystem (IMS) network, wherein the ongoing IMS sessions contain at least one conference call;
an event detection circuit that detects a network-switching event for the UE to switch from the IMS network to another circuit-switched (CS) network;
a call management circuit that determines the one or more ongoing sessions within the IMS network to be released or transferred to the CS network; and
a handover circuit that performs a session transfer procedure for transferring the determined sessions, wherein one ongoing session with an inactive speech media component is a conference call, and wherein the UE replaces the speech media component of the most recently inactive conference call with a newly established held CS multiparty voice call, wherein an active IMS ongoing session is a conference call and has been transferred as an active CS multiparty voice call, and wherein the UE associates participants in the conference call session with transaction identifiers 0, 2, 3, 4, and 5.

12. The UE of claim 11, wherein one ongoing session with an active speech media component exists, and wherein the UE replaces the speech media component of the most recently active session with a newly established active CS voice call.

13. The UE of claim 11, wherein the network-switching event includes the UE receives a Single Radio Voice Call Continuity (SRVCC) Handover command.

14. The UE of claim 11, wherein the UE maps each transferred session to a corresponding CS call control state, auxiliary state, and transaction identifier (TI) assignment.

15. The UE of claim 11, wherein a first IMS session has been transferred as an active CS voice call, wherein a second IMS session has been transferred as a held CS multiparty voice call, wherein the UE associates the first IMS session with transaction identifier 0, and wherein the UE associates participants in the second IMS session with transaction identifiers 1, 3, 4, 5, and 6.

16. The UE of claim 11, wherein the UE handles an alerting session by releasing the alerting session or transferring the alerting session to CS domain.

* * * * *